United States Patent
Choe

(10) Patent No.: US 7,853,944 B2
(45) Date of Patent: Dec. 14, 2010

(54) APPARATUS AND METHOD FOR MANAGING FIRMWARE OF REMOVABLE MEDIA DEVICE

(75) Inventor: Sung Ho Choe, Seoul (KR)

(73) Assignee: LG Electronics Inc., Seoul (KR)

(*) Notice: Subject to any disclaimer, the term of this patent is extended or adjusted under 35 U.S.C. 154(b) by 1265 days.

(21) Appl. No.: 11/413,171

(22) Filed: Apr. 28, 2006

(65) Prior Publication Data

US 2006/0282833 A1    Dec. 14, 2006

(30) Foreign Application Priority Data

Apr. 29, 2005    (KR) .................... 10-2005-0035863

(51) Int. Cl.
*G06F 9/44* (2006.01)
(52) U.S. Cl. ...................... 717/173; 717/170
(58) Field of Classification Search .......... 717/168–178
See application file for complete search history.

(56) References Cited

U.S. PATENT DOCUMENTS 6,754,895 B1 *   6/2004   Bartel et al. ................ 717/171
2003/0135668 A1*   7/2003   Abe ............................ 710/15
2005/0144612 A1*   6/2005   Wang et al. ................. 717/168
2005/0272418 A1*   12/2005   Vinson et al. ............... 455/420
2007/0028120 A1*   2/2007   Wysocki et al. ............. 713/192

FOREIGN PATENT DOCUMENTS

CN         1584822 A      2/2005

* cited by examiner

*Primary Examiner*—Lewis A Bullock, Jr.
*Assistant Examiner*—Mark A Gooray
(74) *Attorney, Agent, or Firm*—Birch, Stewart, Kolasch & Birch, LLP

(57) ABSTRACT

A method for managing firmware of a removable media device, which includes detecting a key value of the removable media device, checking whether or not the detected key value is stored on a computer that the removable media device is connected to, determining if a version of firmware stored on a server connected to the computer is later than a version of firmware on the removable media device, if the detected key value is stored on the computer, and installing the version of the firmware stored on the server onto the removable media device when the determining step determines the version of the firmware on the server is the later version.

19 Claims, 4 Drawing Sheets

FIG. 2
(a)
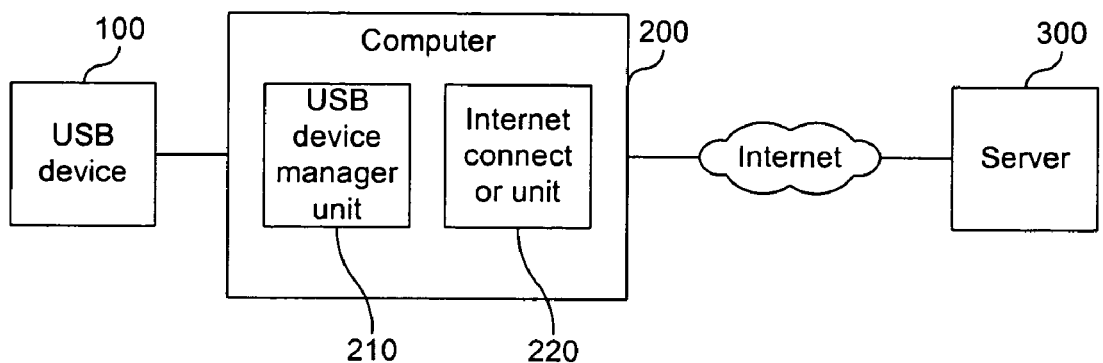
(b)
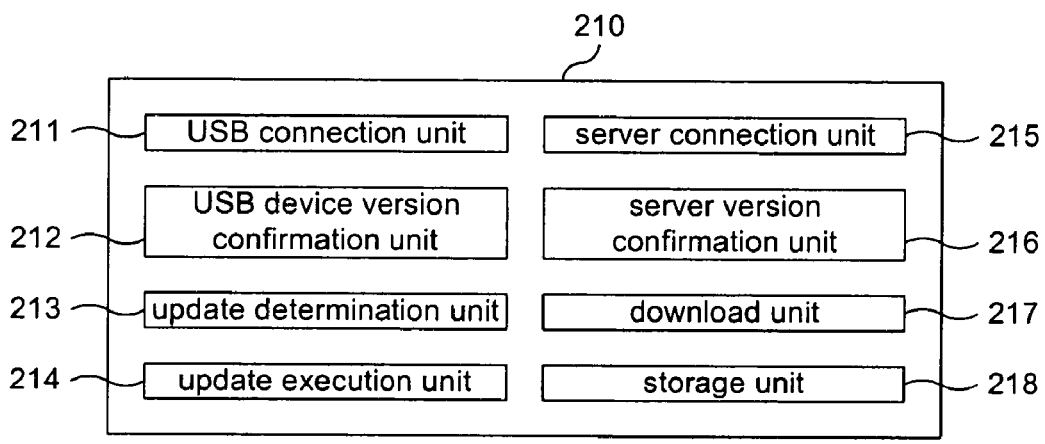

FIG. 3

| Offset | Field | Size | Value |
|---|---|---|---|
| 6 | Device Protocol | 1 | Protocol |
| 7 | Max Packet Size | 1 | Number |
| 8 | idVendor | 2 | ID |
| 10 | idProduct | 2 | ID |
| 12 | bcdDevice | 2 | BCD |
| 14 | iManufacturer | 1 | Index |
| 15 | iProduct | 1 | Index |
| 16 | iSerial Number | 1 | Index |
| 17 | NumConfigurations | 1 | Number |

FIG. 4

| Bit / Byte | 7 | 6 | 5 | 4 | 3 | 2 | 1 | 0 |
|---|---|---|---|---|---|---|---|---|
| 0 | Reserved | | | | Peripheral Device Type | | | |
| 1 | RMB | Reserved | | | | | | |
| 2 | ISO Version | | ECMA Version | | | ANSI Version(00h) | | |
| 3 | Reserved | | | | Response Data Format | | | |
| 4 | Additional Length(31) | | | | | | | |
| 5 | Reserved | | | | | | | |
| 7 | | | | | | | | |
| 8 | Vendor Information | | | | | | | |
| 15 | | | | | | | | |
| 16 | Product Identification | | | | | | | |
| 31 | | | | | | | | |
| 32 | Product Revision Level n.nn | | | | | | | |
| 35 | | | | | | | | |

APPARATUS AND METHOD FOR MANAGING FIRMWARE OF REMOVABLE MEDIA DEVICE

This application claims priority to Korean Application No. 10-2005-0035863 filed in Korea on Apr. 29, 2005, the entire contents of which is incorporated by reference in its entirety.

FIELD OF THE INVENTION

The present invention relates to an apparatus and a method for managing firmware of a removable media device, and more particularly to an apparatus and a method for automatically updating firmware of a removable media device based on a detected key value of the removable media device.

DESCRIPTION OF THE RELATED ART

Current removable media devices or removable storage devices are usually connected to a computer through, for example, a Universal Serial Bus (USB), and are used to exchange data with the computer. The USB is a serial port and is often referred to as a Plug & Play interface, which allows a peripheral device such as an audio player, a joystick, a keyboard, a telephone, etc. to be simply plugged into the computer.

Further, the USB interface is faster and can be connected more conveniently than the typical serial port. For example, the USB version 1.1 supports a speed of 12 Mbps per second and the USB version 2.0 supports a speed of 480 Mbps per second. The USB interface can also interconnect a maximum of 128 devices. Further, the USB interface immediately recognizes a newly added device even while the computer is being used, and does not require a separate power source. In addition, a computer generally has two USB ports which can be split into more ports using a USB hub so the computer can be connected to a plurality of peripheral devices. Hereinafter, a removable media device connected through a USB interface is referred to as a "USB device."

Turning now to FIG. 1, which is a flowchart of a related art process for updating firmware of a USB device. As shown, to update the firmware of a USB device, a user first downloads and stores a firmware file for updating of the USB device through the Internet, from a compact disc (CD), etc. or from a firmware file provided in advance by a manufacturer of the USB device (step S101).

Then, the user connects the USB device to the computer (step S102), and the firmware file stored on the computer is transmitted to the USB device (step S103). Further, the USB device determines if the version of the received firmware file is newer than a currently operating firmware version (step S104).

When the received firmware file is a newer version (Yes in step S104), the USB device stores in a buffer the received firmware file (step S105). Further, an upgrade program used to upgrade the firmware version is also stored into the buffer (step S106).

The USB device then executes the upgrade program to delete the current firmware file (step S107), and store the new firmware file in the flash memory (step S109). When the new version of a firmware file has been stored in the flash memory, the USB device is driving using the new firmware (step S109). However, when the received firmware file is not a newer version (No in step S104), the update process is terminated.

Thus, according to the related art firmware update process, the user must first confirm if a newer version of the firmware exists, for example, by visiting a homepage of the manufacturer of the USB device. Further, a newer version has to be first downloaded and stored on the computer before it can be updated on the USB device. Therefore, it is inconvenient for the user to update the firmware of a USB device. In addition, there is no way to prevent a copyright version of the firmware from being illegally copied onto the computer.

SUMMARY OF THE INVENTION

Accordingly, one object of the present invention is to address the above noted and other problems.

Another object of the present invention is to provide a method and an apparatus for managing firmware of a removable media device such as an MP3 player.

Yet another object of the present invention to provide a method and an apparatus for automatically updating the firmware of a removable media device.

Still another object of the present invention is to provide a method and apparatus for preventing someone from illegally updating the firmware of a removable media device.

To achieve these and other advantages and in accordance with the purpose of the present invention, as embodied and broadly described herein, the present invention provides in one aspect a method for managing firmware of a removable media device. The method includes detecting a key value of the removable media device, checking whether or not the detected key value is stored on a computer that the removable media device is connected to, determining if a version of firmware stored on a server connected to the computer is later than a version of firmware on the removable media device, if the detected key value is stored on the computer, and installing the version of the firmware stored on the server onto the removable media device when the determining step determines the version of the firmware on the server is the later version.

According to another aspect, the present invention provides a computer program product on at least one recordable medium for managing firmware of a removable media device. The computer program product includes a first computer code configured to detect a key value of the removable media device, a second computer code configured to check whether or not the detected key value is stored on a computer that the removable media device is connected to, a third computer code configured to determine if a version of firmware stored on a server connected to the computer is later than a version of firmware on the removable media device, if the detected key value is stored on the computer, and a fourth computer code configured to install the version of the firmware stored on the server onto the removable media device when the third computer code determines the version of the firmware on the server is the later version.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more apparent from the following detailed description taken in conjunction with the accompanying drawings, wherein:

FIG. 2(a) is an overview of an apparatus for automatically updating firmware of a USB device in accordance with an embodiment of the present invention;

FIG. 2(b) is a block diagram of a USB device manager unit shown in FIG. 2(a);

FIG. 3 illustrates an example of a USB descriptor file including information related to the firmware version;

FIG. 4 illustrates an example of a data format transmitted from the USB device to a host, which includes the firmware version information of the USB device.

DETAILED DESCRIPTION OF PREFERRED EMBODIMENTS

Figure 1:
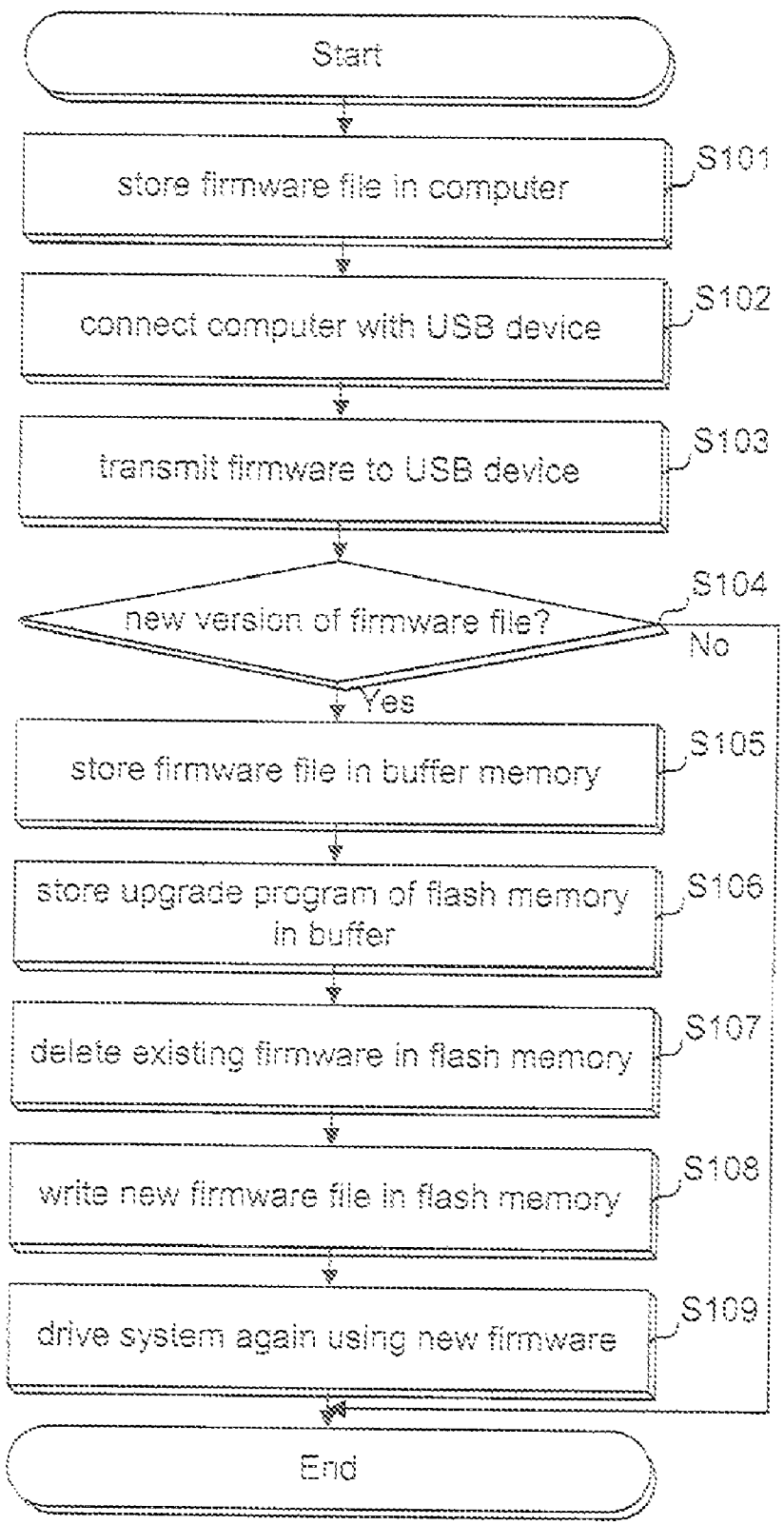
FIG. 1 is a flowchart of a related art process for updating firmware of a USB device.

A method and an apparatus for managing firmware of a USB device in accordance with an embodiment of the present invention will now be described in more detail with reference to the accompanying drawings.

In more detail, FIG. 2(a) in an overview illustrates an apparatus for automatically updating firmware of a USB device in accordance with an embodiment of the present invention. As shown, a computer 200 is connected to a USB device 100 capable of storing data through a USB interface. The computer 200 is also connected to a server 200 storing the latest firmware file for the USB device via the Internet. In addition, the computer 300 includes a USB device manager unit 210 and an Internet connector unit 220. Further, the USB device manager unit 210 recognizes when the USB device 100 is connected and automatically updates the firmware of the USB device 100. The Internet connector unit 220 connects the computer 200 to the server 300 via the Internet.

In addition, the USB device 100 includes a flash memory, which stores the firmware for operating the device, an update program for updating the firmware, etc. The server 300 stores a plurality of firmware files including the latest firmware version for the USB device 200 and transmits a firmware file in response to a request from the computer 200. The transmitted firmware file corresponds to an operation program for operating the USB device 100. Thus, when the USB device 100 has been connected to the computer 200 through the USB interface, the USB device manager unit 210 determines the current firmware of the USB device 100 and the latest version of firmware files stored in the server 300.

Further, the USB device 100 stores and manages its own firmware version using a USB descriptor file. In more detail, the USB descriptor file includes various information which enables the computer 200 to recognize the USB device 100 has been connected. The USB descriptor file also includes the information about the firmware version, which can also be automatically registered in a registry of the computer 200 when the USB device 100 is connected to the computer 200. Further, the firmware information may also be stored as a separate text document on the USB device 100.

In addition, the USB device manager unit 210 compares the firmware version of the connected USB device 100 with the firmware version managed in the server 300. When the version of the firmware file stored on the server 300 is newer than the firmware version on the USB device 100, the USB device manager unit 210 downloads the firmware file stored on the server 300 and performs the firmware update process for the USB device 100.

Turning now to FIG. 2(b), which is a block diagram of the USB device manager unit 210 shown in FIG. 2(a). The functions of the USB device manager unit 210 may be implemented by a hardware module or a software program, and similar functions may be incorporated and implemented in a single module.

As shown in FIG. 2, the USB device manager unit 210 includes a USB connection unit 211 for detecting and recognizing a connected USB device 100, a USB device version confirmation unit 212 for determining the current version of the firmware on the connected USB device 100, an update determination unit 213 for determining if it is necessary to update the firmware to a newer version, an update execution unit 214 for executing the firmware update process, a server connection unit 215 for connecting the computer 200 to the server 300 through the Internet, a server version confirmation unit 216 for determining the versions of the firmware files stored on the server 300, a download unit 217 for downloading a firmware file stored on the server 300, and a storage unit 218 for storing the downloaded firmware file together with the appropriate firmware update program(s).

Further, the USB connection unit 211 and the server connection unit 215 may be incorporated into a single connection unit, and the USB device version confirmation unit 212 and the server version confirmation unit 216 may be incorporated into a single version confirmation unit. Similarly, the update determination unit 213 and the update execution unit 214 may be incorporated into a single update unit.

In addition, the USB connection unit 211 detects when the USB device 100 is connected to the computer 200 and exchanges data with the USB device 100. The USB device version confirmation unit 212 analyzes the USB descriptor file transmitted from the connected USB device 100 and checks the firmware version included in the transmitted USB descriptor.

In more detail, FIG. 3 illustrates an example of a USB descriptor file including the firmware version information, and FIG. 4 illustrates an example of a data format transmitted from the USB device 100. In FIG. 3, the "iProduct" field having an offset value of 15 in the USB descriptor file includes the firmware version information in addition to the name of the USB device 100. Further, as shown in FIG. 4, the firmware version information may be additionally inserted in the "Product Revision Level" field at the lowest bytes (byte No. 32-34) in the data format transmitted from the USB device 100.

In addition, the USB connection unit 211 receives the USB descriptor file from the USB device 100, and the USB device version confirmation unit 212 determines the version information included in the USB descriptor file. Alternatively, the USB device version confirmation unit 212 determines the firmware version of the USB device 100 by receiving the firmware information stored as a text type document (e.g. as "version.ini" or "version.txt") in a separate storage space of the USB device 100. The separate storage space may be either a portion of the main storage space embedded in the USB device such as an MP3 player, a Portable Multimedia Player (PMP), a Portable Media Center (PMC), a mobile phone, an electronic dictionary, etc., or a partial area of an Electrically Erasable and Programmable Read Only Memory (EEPROM) or a separate flash memory in the USB device.

In addition, when the USB device 100 has been connected to the computer 200, the USB device manager unit 210 reports the name of the confirmed USB device and/or the firmware version information to the user, so the user can confirm the reported information. For example, the name of the connected USB device and/or the firmware version information may be displayed on a display screen of the USB device 100 to inform the user.

Further, the server connection unit 215 connects to the server 300 through the Internet, and the server version confirmation unit 216 determines the versions of the firmware files stored on the server 300. After the USB device version confirmation unit 212 determines the firmware version of the USB device 100 and the server version confirmation unit 216 determines the versions of the firmware files stored on the server 300, the update determination unit 213 compares the firmware version of the USB device 100 with the versions stored on the server 300, and then determines if it is necessary to update the firmware of the USB device 100. When an update is necessary, the download unit 217 downloads the new firmware version from the server 300.

Figure 5:
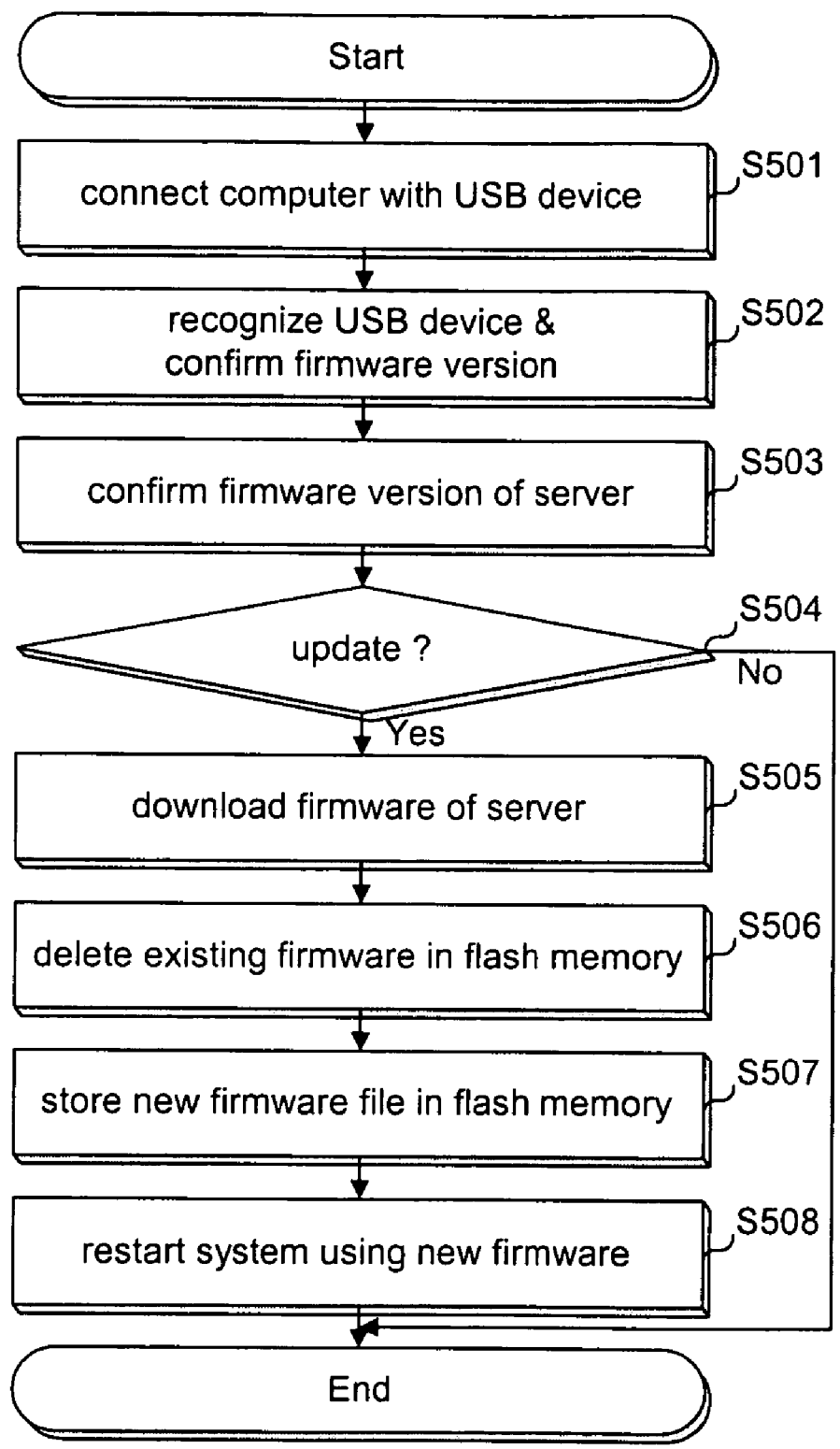
FIG. 5 is a flowchart of a method for automatically updating firmware of a USB device in accordance with an embodiment of the present invention.

Turning now to FIG. 5, which is a flowchart of a method for automatically updating the firmware of a USB device in accordance with an embodiment of the present invention. As shown, when the USB device 100 is connected to the computer 200 (step S501), the USB connection unit 211 recognizes the USB device 100 by receiving the USB descriptor file transmitted from the USB device 100, and the USB device version confirmation unit 212 determines the version information of the firmware of the USB device 100 included in the received USB descriptor file (step S502).

After receiving a report from the USB connection unit 211 that the USB device 100 has been connected, the server connection unit 215 connects with the server 300 through the Internet, and the server version confirmation unit 216 determines the firmware version for the USB device 100 stored on the server 300 (step S503).

Then, the update determination unit 213 compares the version of the firmware of the USB device 100 with the firmware versions stored on the server 300 and determines if it is necessary to perform a firmware update process (step S504). That is, step S504 determines it is necessary to perform the firmware update process when the version of the firmware file stored on the server 300 is newer than the current firmware version of the USB device 100. As a result of the determination in step S504, when it is necessary to perform the firmware update process (Yes in step S504), the download unit 217 downloads the new firmware file from the server 300 (step S505) and stores the downloaded file in the storage unit 218.

Then, the update execution unit 214 deletes the existing firmware stored in the flash memory of the USB device 100 (step S506), and stores the new version of firmware file stored in the storage unit 218 into the flash memory of the USB device 100 (step S507). Thereafter, the update execution unit 214 restarts the USB device 100 using the new firmware (step S508), thereby completing the firmware update process.

In addition, when the firmware information is stored as a text type file in a separate storage space of the USB device 100, the update execution unit 214 generates a text type file containing new version information of firmware to be updated and records the generated file in the separate storage space of the USB device 100. The file containing the new firmware version information may be recorded either in place of the previous firmware version information file stored in the separate storage space of the USB device 100 or additionally with another filename to the previous firmware version information file.

According to the embodiment of the present invention as described above, the USB device manager unit 210 stores a program for executing the update of the USB device 100 in the storage unit 218, so the update execution unit 214 can update the firmware of the USB device 100. However, there are various methods for executing the update according to the types of the USB device 100. For example, the USB device manager unit 210 may call an update program stored in advance in the flash memory of the USB device 100 and use it for the update process.

Also, the USB device manager unit 210 can set the update process to be automatically performed when the computer 200 is booted, to be started by a user, or to be automatically started when the USB device 100 is connected with the computer 200. Further, while the computer 200 is connected to the USB device 100, the USB device manager unit 210 may periodically perform steps S502 through S508 to update the firmware of the USB device 100 to include the new firmware.

Further, in another embodiment, the present invention provides a method for managing firmware of a removable media device. The method includes detecting a key value of the removable media device, checking whether or not the detected key value is stored on a computer that the removable media device is connected to, and determining if a version of firmware stored on a server connected to the computer is later than a version of firmware on the removable media device, if the detected key value is stored on the computer. These steps may be executed in step S504 of FIG. 5. The method also includes installing the version of the firmware stored on the server onto the removable media device when the determining step determines the version of the firmware on the server is the later version (steps S505-S506).

Further, the key value preferably includes a product identification (pid) or vendor identification (vid) of the removable media device, the removable media device may be connected to the computer through a Universal Serial Bus (USB), and information about the version of the firmware on the removable media device may be stored in a Universal Serial Bus (USB) descriptor.

In addition, the information about the version of the firmware on the removable media device may be stored in a text form in the USB descriptor, or as a separate text tile in a portion of a memory of the removable media device. Further, the memory may include, for example, a main storage space, an Electrically Erasable and Programmable Read Only Memory (EEPROM), a flash memory embedded in the removable media device, etc. The user may also be prompted to OK the installation of the version of the firmware stored on the server onto the removable media device. Also, the removable may device include, for example, an MP3 player, a Portable Multimedia Player (PMP), a Portable Media Center (PMC), a mobile phone, an electronic dictionary equipped with a USB interface, etc.

The method also includes searching a table stored on the computer for the key value of the removable media device, and reading an optimum version from the table corresponding to the key value of the removable media device.

Further, the later version of the firmware stored on the server is installed onto the removable media device if the optimum version corresponds with the later version of the firmware stored on the server, and is not installed onto the removable media device if the optimum version does not correspond with the later version of the firmware stored on the server.

According to the present invention as described above, the firmware of a removable media device can be automatically updated to the newest version, and the removable media device can operate using the newest version of firmware while it is connected to a host. Further, it is possible to protect users from illegally copying firmware files.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

Any portion of the present invention implemented on a general purpose digital computer or microprocessor includes a computer program product which is a storage medium including instructions which can be used to program a computer to perform a process of the invention. The storage medium can include, but is not limited to, any type of disk including floppy disk, optical disk, CD-ROMs, and magneto-optical disks, ROMs, RAMs, EPROMs, EEPROMs, magnetic or optical cards, or any type of media suitable for storing electronic instructions.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for managing firmware of a removable media device, the method comprising:
    determining, via an interface device, if the removable media device is connected to a computer;
    detecting, by the computer, a key value of the removable media device when the determining step determines the removable media device is connected to the computer;
    checking, by the computer, whether or not the detected key value is stored on the computer;
    if the key value is stored on the computer, performing the steps of:
    searching, by the computer, a table stored on the computer for the key value of the removable media device;
    identifying, by the computer, a version of firmware stored on a server connected to the computer that is later than a version of firmware on the removable media device, wherein information about the version of the firmware on the removable media device is stored as a separate file in a portion of a memory of the removable media device; and
    installing, by the computer, the firmware stored on the server whose version is later than the version of the firmware on the removable media device onto the removable media device,
    wherein the installing step further includes determining if the optimum version corresponds with the version of the firmware stored on the server, first deleting the firmware on the removable media device, installing the firmware stored on the server onto the removable media device, and restarting the removable media device using the newly installed firmware, if the optimum version does not correspond with the later version of the firmware stored on the server and the later version is not installed onto the removable media device.

2. The method as claimed in claim 1, wherein the key value includes a product identification (pid) or vendor identification (vid) of the removable media device.

3. The method as claimed in claim 1, wherein the removable media device is connected to the computer through a Universal Serial Bus (USB).

4. The method as claimed in claim 3, wherein the information about the version of the firmware on the removable media device is stored in a Universal Serial Bus (USB) descriptor.

5. The method as claimed in claim 4, wherein the information about the version of the firmware on the removable media device is stored in a text form in the USB descriptor.

6. The method as claimed in claim 1, wherein the memory comprises at least one from a main storage space, an Electrically Erasable and Programmable Read Only Memory (EEPROM), and a flash memory embedded in the removable media device.

7. The method as claimed in claim 1, further comprising:
    displaying information on the computer about the version of the firmware stored on the server being later than the version of the firmware on the removable media device when the version of the firmware stored on the server is the later version.

8. The method of claim 7, wherein the information displayed on the computer requests a user to OK the step of installing the firmware stored on the server onto the removable media device.

9. The method as claimed in claim 1, wherein the removable media device is one of an MP3 player, a Portable Multimedia Player (PMP), a Portable Media Center (PMC), a mobile phone, and an electronic dictionary equipped with a USB interface.

10. A computer program product on at least one recordable medium for managing firmware of a removable media device, said computer program product comprising:
    a first computer code configured to determine if the removable media device is connected to a computer, and to detect a key value of the removable media device when the removable device is connected to the computer;
    a second computer code configured to check whether or not the detected key value is stored on a computer that the removable media device is connected to;
    if the key value is stored on the computer,
    a third computer code configured to search a table stored on the computer for the key value of the removable media device;
    a fourth computer code configured to identify a version of firmware stored on a server connected to the computer that is later than a version of firmware on the removable media device, wherein information about the version of the firmware on the removable media device is stored as a separate file in a portion of a memory of the removable media device; and
    a fifth computer code configured to install the firmware stored on the server whose version is later than the version of the firmware on the removable device onto the removable media device when the third computer code determines the version of the firmware on the server is the later version,
    wherein the fifth computer code is further configured to determine if the optimum version corresponds with the version of the firmware stored on the server, first delete the firmware on the removable media device, install the firmware stored on the server onto the removable media device, and restart the removable media device using the newly installed firmware, if the optimum version does not correspond with the later version of the firmware stored on the server and the later version is not installed onto the removable media device.

11. The computer program product as claimed in claim 10, wherein the key value includes a product identification (pid) or vendor identification (vid) of the removable media device.

12. The computer program product as claimed in claim 10, wherein the removable media device is connected to the computer through a Universal Serial Bus (USB).

13. The computer program product as claimed in claim 12, wherein the information about the version of the firmware on the removable media device is stored in a Universal Serial Bus (USB) descriptor.

14. The computer program product as claimed in claim 12, wherein information about the version of the firmware on the removable media device is stored in a text form in the USB descriptor.

15. The computer program product as claimed in claim 10, wherein the memory comprises at least one from a main storage space, an Electrically Erasable and Programmable Read Only Memory (EEPROM), and a flash memory embedded in the removable media device.

16. The computer program product as claimed in claim 10, further comprising:
a sixth computer code configured to display information on the computer about the version of the firmware stored on the server being later than the version of the firmware on the removable media device when the firmware stored on the server is the later version.

17. The computer program product of claim 16, wherein the information displayed on the computer requests a user to OK the fifth computer code installs the firmware stored on the server onto the removable media device.

18. The computer program product as claimed in claim 10, wherein the removable media device is one of an MP3 player, a Portable Multimedia Player (PMP), a Portable Media Center (PMC), a mobile phone, and an electronic dictionary equipped with a USB interface.

19. The computer program product as claimed in claim 10, wherein the computer program product is executed on the computer.

* * * * *